(12) United States Patent
Gondi et al.

(10) Patent No.: US 9,154,396 B2
(45) Date of Patent: Oct. 6, 2015

(54) PASSIVE MEASUREMENT OF AVAILABLE LINK BANDWIDTH

(71) Applicant: General Instrument Corporation, Horsham, PA (US)

(72) Inventors: Santosh Gondi, Bangalore (IN); Padmagowri Pichumani, Bangalore (IN); Shailesh Ramamurthy, Bangalore (IN)

(73) Assignee: ARRIS Technology, Inc., Suwanee, GA (US)

( * ) Notice: Subject to any disclaimer, the term of this patent is extended or adjusted under 35 U.S.C. 154(b) by 187 days.

(21) Appl. No.: 13/831,383

(22) Filed: Mar. 14, 2013

(65) Prior Publication Data

US 2014/0269401 A1 Sep. 18, 2014

(51) Int. Cl.
*H04L 12/26* (2006.01)
*H04L 29/06* (2006.01)

(52) U.S. Cl.
CPC .......... *H04L 43/0876* (2013.01); *H04L 65/607* (2013.01); *H04L 65/80* (2013.01); *H04L 43/10* (2013.01)

(58) Field of Classification Search
CPC .................................. H04L 43/0876
USPC ......................................................... 370/253
See application file for complete search history.

(56) References Cited

U.S. PATENT DOCUMENTS

| | | | |
|---|---|---|---|
| 6,292,834 B1 | 9/2001 | Ravi et al. | |
| 7,545,749 B2 | 6/2009 | Jourdain et al. | |
| 7,675,856 B2* | 3/2010 | Padmanabhan et al. | 370/235 |
| 7,675,919 B2* | 3/2010 | Vestal | 370/395.4 |
| 7,782,794 B2* | 8/2010 | Sebastian | 370/253 |
| 8,358,580 B2* | 1/2013 | Ray et al. | 370/230 |
| 8,687,507 B2* | 4/2014 | Johnsson et al. | 370/248 |

OTHER PUBLICATIONS

P. Papageorge, et al., "Passive Aggressive Measurement with MGRP", Aug. 17-21, 2009, Barcelona, Spain, pp. 279-290.
M. Zangrilli, et al., "Using Passive Traces of Application Traffic in a Network Monitoring System", IEEE, 2004, pp. 77-86.

* cited by examiner

*Primary Examiner* — Anh-Vu Ly
*Assistant Examiner* — Abdullahi Ahmed
(74) *Attorney, Agent, or Firm* — Thomas A. Ward

(57) ABSTRACT

A method of passively measuring available link bandwidth at a client device that receives media data over a network connection comprising receiving packets of a media stream at the client device, wherein one or more the of packets comprises a unique identifier indicating that one or more the packets are associated with a macro burst sorting the received packets into one or more the macro bursts based on the unique identifiers, and determining the link bandwidth available to the client device based at least in part on the time intervals between arrival times of the packets sorted into individual macro bursts, wherein the macro bursts each comprise a plurality of packets transmitted together by a sending device to regulate the sending device's transmission rate.

16 Claims, 11 Drawing Sheets

Inter packet arrival time threshold (Tth) = 10ms

Inter packet arrival time threshold (Tth) = 100ms

Inter packet arrival time threshold (Tth) = 200ms

Inter packet arrival time threshold (Tth) = 300ms

PASSIVE MEASUREMENT OF AVAILABLE LINK BANDWIDTH

TECHNICAL FIELD

The present disclosure relates to the field of measuring a network's available bandwidth, in particular a method for client devices that receive streaming media to passively measure the available link bandwidth.

BACKGROUND

Streaming media such as video and/or audio over networks has become prevalent. Client devices such as personal computers, set-top boxes, mobile devices, and other equipment can receive media streams from content servers and/or other client devices. The media streams can be transmitted over proprietary operator managed networks, and/or over open, publicly available networks such as the internet. In many situations, individual media streams can be available at different quality levels, and client device can request that the media streams be sent at specific quality levels.

When a client device has knowledge of current network conditions, such as a measurement of the available link bandwidth, the client device can request the best quality version of the media stream for the current network conditions. For example, the client device can request the media stream at the highest possible bitrate that can be sent over the currently available link bandwidth, and/or change the requested quality level of the media stream as the available link bandwidth changes over time.

Various methods for measuring network conditions have been developed. However, existing methods do not measure the available link bandwidth using passive methods.

In some measurement methods the client device can measure the rate at which data is received to obtain the link throughput, however the link throughput can differ substantially from the available link bandwidth. A measurement of the link throughput can be useful in some situations, such as when the transmission rate is greater than the available link bandwidth. However, when the transmission rate is lower than the available link bandwidth, the client device is unable to determine how much link bandwidth is actually available above the rate of transmission. Attempts to blindly increase the transmission rate to fit to a best guess of the available link bandwidth can lead to buffer under-flows when too aggressive in estimating a greater bandwidth than available, or lead to less than full use of the available bandwidth when not aggressive enough.

In other methods, active measurement methods can be used that introduce probe packets. In some of these active methods, the packets of a media stream can be piggybacked onto probe packets that are actively measured. For real time media delivery, this can impact the ability for a server to control and regulate its rate of transmission, as the media content delivery rate and timing would be controlled by the active bandwidth measurement tools. In other embodiments, active measurement methods introduce extra probe packets that can lead to traffic bottlenecks on the network.

In another measurement method, packet traces of existing application traffic can be used to estimate available bandwidth. However, these methods can lead to unreliable measurements of available bandwidth because they look at diffusion based on inter-packet arrival times of only a pair of packets, or a train of packets.

Still other measurement methods measure the bandwidth or link capacity of bottlenecks on the network. However, these methods do not look at cross traffic on the network, and therefore do not measure the actual available link bandwidth.

Further, as will be discussed below many adaptive bitrate streaming schemes use HTTP over the Transmission Control Protocol (TCP) for transport. These schemes rely on TCP throughput for estimating the available link bandwidth. TCP's inefficiency in scaling with high BDP (bandwidth delay product) networks is well-known. Given the advent of high BDP networks in recent times, a mechanism for measuring available link bandwidth independent of TCP's throughput is needed.

SUMMARY

What is needed is a method that can be employed by a client device to measure its available link bandwidth, so that the client device can request and/or receive the best quality version of a media stream for the currently available link bandwidth, and or change the quality level of a media as the available link bandwidth changes over time. The present disclosure provides a method for a client device to measure its available link bandwidth using passive methods, in which the client device can use demarked packets to distinguish between different macro bursts of data, and use the dispersion of the packets within each demarked macro burst to determine a measurement of the available link bandwidth.

In one embodiment, the present invention includes a method of passively measuring available link bandwidth at a client device that receives media data over a network connection, the method comprising receiving packets of a media stream at the client device, wherein one or more the of packets comprises a unique identifier indicating that one or more the packets are associated with a macro burst, sorting the received packets into one or more of the macro bursts based on the unique identifiers, and determining the link bandwidth available to the client device based at least in part on the time intervals between arrival times of the packets sorted into individual macro bursts, wherein the macro bursts each comprise a plurality of packets transmitted together by a sending device to regulate the sending device's transmission rate.

BRIEF DESCRIPTION OF THE DRAWINGS

Further details of the present invention are explained with the help of the attached drawings in which.

DETAILED DESCRIPTION

Figure 1:
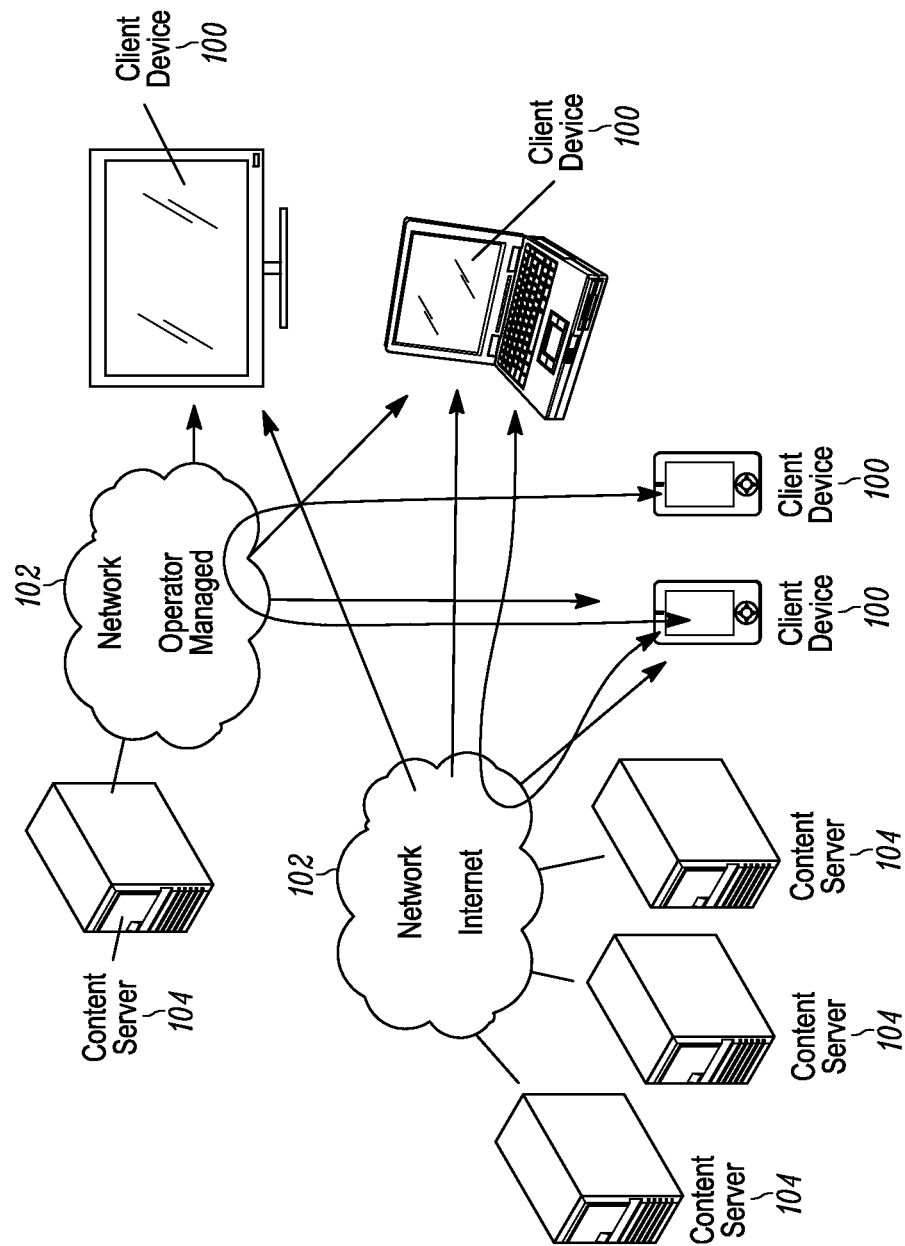
FIG. 1 depicts a networked system in which one or more client devices can receive audio and/or video content delivered as media streams over networks from content servers 104 and/or other client devices.

FIG. 1 depicts a networked system in which one or more client devices 100 can receive audio and/or video content delivered as media streams over networks 102 from content servers 104 and/or other client devices 100. Client devices 100 can be network-connected devices such as personal computers, set-top boxes, tablet computers, mobile phones, personal media players, mobile devices, gaming systems, and/or any other devices capable of connecting to a network 102.

The media streams can be transported over one or more networks 102. The networks 102 can be the internet, operator managed networks such as networks operated by a wireless service provider for mobile devices, local networks, wireless networks, CDNs (content distribution networks) managed by content or service providers, or any other type of network. By way of a non-limiting example, in some embodiments over-the-top (OTT) services, such as video streaming services, can deliver media streams to consumers over one or more existing networks 102 such as the internet. In some embodiments, the media stream and other files can be transported over the networks 102 using, for example, Hypertext Transfer Protocol (HTTP).

The bandwidth of a network 102 can limit how much or how fast data is transmitted over the network 102. When there is heavy traffic over the network 102, there can be less available bandwidth for new transmissions. As the amount of traffic on the network 102 changes, the amount of available bandwidth can change over time.

In some situations and/or embodiments, content servers 104 can transmit media streams to client devices 100 over the networks 102. By way of a non-limiting example, video streaming services can have content servers 104 that store media files. The media files can be sent as a stream of data packets from the service's content server 104 over one or more networks 102 to one or more client devices 100.

In other situations and/or embodiments, client devices 100 can receive and/or transmit media streams to other client devices 100 over the networks 102. By way of a non-limiting example, during a video chat or video conference one client device 100 can receive a video stream from one or more other client devices 100 while also transmitting a video stream to those other client devices 100.

Streaming Media Schemes

Different schemes can be used to change the quality of media streams over time. One such scheme is an adaptive bitrate streaming scheme. Various adaptive bitrate streaming schemes include MPEG DASH, HTTP-Live-Streaming (HLS), and Silverlight Smooth Streaming. By way of a non-limiting example, HLS uses segmented transport stream (TS) based video streams or files, with an MPEG transport stream container that encapsulates MPEG-4 AVC (H.264) video files and AAC audio. In adaptive bitrate streaming schemes, multiple versions of a media asset can be available at a content server 104. By way of a non-limiting example, a content server 104 can store a low quality version of the media asset, a medium quality version of the media asset, and a high quality version of the media asset. The quality of the media asset can be determined by the bitrate used to encode the media asset, with higher bitrates corresponding to higher quality versions of the media asset. The media asset can be transmitted to a client device as a media stream.

In adaptive bitrate streaming, each version of a single media asset can be divided into a plurality of chunks. Chunks can be smaller files than the entire media asset. By way of a non-limiting example, a media asset can be divided into chunks of 5 to 30 seconds each. The chunks of each quality version of the media asset can be synchronized, such that each quality version of the media asset comprises the same number of chunks as the other versions. Each synchronized chunk can have the same media content as the other versions, but be encoded at a different bitrate. In some embodiments, each chunk can be synchronized independently. The content server 104 can have an index file that can point to the chunk files of the overall media asset. As the media asset is streamed to the client device 100, the client device 100 can request that the chunks of the media asset be sent from the content server 104 at a quality appropriate for the current network conditions and/or processing capabilities of the client device 100. If the network conditions or processing capabilities of the client device 100 change during playback of a media stream, the client device 100 can request a lower or higher quality version of the next chunk of the media stream.

Other streaming schemes involve scalable media delivery, such as scalable video and/or image coding. Various scalable streaming schemes are JPEG 2000 and Scalable Video Coding (SVC), which can allow incremental and/or interactive access to visual content. Scalable media delivery can offer multidimensional scalability, such as quality and/or bitrate scalability, resolution scalability, spatial random access, temporal scalability, and/or highly efficient compression. Compressed scalable streaming files can be stored in a codestream syntax file that can allow a client device 100 to access appropriate byte rages from the file. In some embodiments, the client device 100 can parse a one or more index tables, which are tree-structured, randomly accessible catalog of the byte-ranges of various bitrate and/or quality versions, in order to identify and access header information indicating which bitrate and/or quality versions are available to the client device 100. The client device 100 can therefore access the media stream from the file at a desired data range with the appropriate quality, resolution, or other scalable quality. By way of a non-limiting example, in some embodiments, the client device 100 can access a media stream at a desired byte range. Scalable media streams can be delivered over commonly available HTTP servers, because HTTP/1.1 allows such byte range access. When the client device 100 can measure the available link bandwidth, the client device 100 can determine an appropriate data range to request and/or consume from the scalable stream for the measured available link bandwidth.

In some embodiments, the client device 100 can maintain a cache of data previously received from the content server 104, and the content server 104 can maintain a model of the client device's cache to avoid retransmission of data already received by the client device 100. If the client device 100 already has a low quality version of the media stream in its cache, the client device 100 can choose to request incremental data that improves the quality of the data already stored in the client device's cache. By way of non-limiting examples, the client device 100 can request incremental data to improve the quality of client-initiated replays of portions of the media stream already received at a low quality.

It should be noted that although in the disclosure below media streams are often discussed as being transmitted from a content server 104 to a client device 100, in some embodiments one client device 100 can act as the described content server 104, such that one client device 100 can transmit a media stream to another client device 100 that receives the media stream. For example, client devices 100 can send media streams to each other, such as in video chat applications, video conferencing applications, Voice over Internet Protocol (VoIP) calls, and/or other communications. In these embodiments, the sending client device 100 can effectively act as a content server 104.

Figure 2:
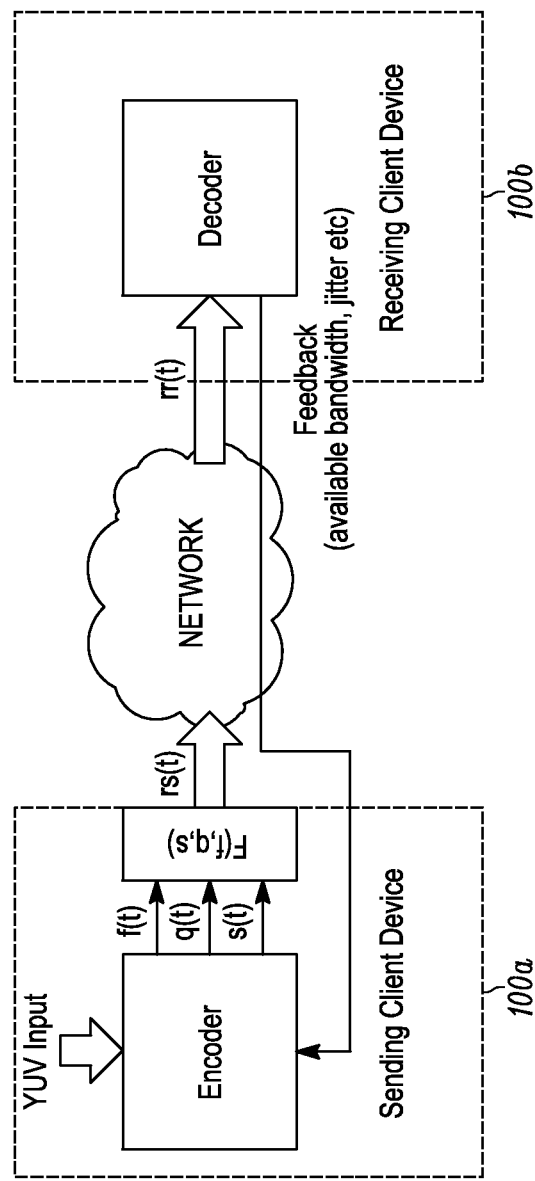
FIG. 2 depicts an exemplary video chat system in which one client device transmits a video stream to a second client device.

Some client device 100 to client device 100 applications can adjust the quality of media streams sent over networks 102 based on at least in part on feedback from the client device 100 that receives the media stream. By way of a non-limiting example, FIG. 2 depicts an exemplary video chat system in which client device 100a transmits a video stream to client device 100b. FIG. 2 depicts an embodiment of a known prior art video chat system, as shown in "Skype Video Responsiveness to Bandwidth Variations" by Luca De Cicco, Saverio Mascolo, and Vittorio Palmisano, NOSSDAV '08 (2008). As shown in FIG. 2, client device 100b can send feedback to client device 100a based on its available link bandwidth and/or the packet loss rate and jitter of the received media stream. Client device 100a can throttle the sending rate (rs(t)) of its media stream based on the feedback received from client device 100b by adjusting its encoding parameters to change the video frame rate (f(t)), the frame quality (q(t)), and/or the resolution (s(t)). Similarly, if client device 100b is also transmitting a video stream to client device 100a, the client device 100b can throttle its own sending rate based on feedback received from client device 100a. A measurement by the receiving client device 100 of its available link bandwidth can allow the receiving client device 100 to provide feedback to the sending client device 100, such that the sending client device 100 can adjust its encoding parameters accordingly to fit the media stream to the link bandwidth measured by and available to the receiving client device 100.

Bandwidth Measurement

In adaptive bitrate streaming, scalable media delivery, client device to client device streaming, or other streaming schemes, it can be useful for the receiving client device 100 to have a measurement of the available link bandwidth, in order for the client device 100 to request the media stream at a quality level appropriate for the currently available link bandwidth. Active and passive methods can both be used to measure available link bandwidth. In active methods a train of probe packets can be introduced to the network 102, and the dispersion of the probe packets can be measured at the receiving end to estimate the available link bandwidth. However, active measurement methods can have a detrimental effect on overall network traffic because the added probe traffic can cause significant bottlenecks to overall traffic over the network 102, especially when a content server 104 streams media to a large number of client devices 104 and the additional probe traffic is sent to all of the client devices 104.

In contrast, passive methods of bandwidth measurements do not introduce additional traffic to the network 102. However, passive methods have traditionally not been as accurate as active bandwidth measurements. Traditional passive measurement methods observe packets that are received at the client device 100, thereby giving a measurement of the link throughput, not the actual available link bandwidth. Link throughput is the rate at which data packets arrive at the end client device 100, while the available link bandwidth is the maximum data rate of reception when the content server 104 transmits data at maximum capacity. In many situations, the link throughput can differ substantially from the actual available link bandwidth. For example, in some situations the content server 104 can transmit data at a transmission rate lower than the available link bandwidth, which would lead to the link throughput being lower than the available link bandwidth.

Dispersion

The concept of dispersion can be used in either active or passive measurement methods to measure the available link bandwidth. When files are transmitted over networks 102, they can pass through transport layers, such as the Transmission Control Protocol (TCP) and User Datagram Protocol (UDP). In some situations and/or embodiments, transport layers can have rate control and/or congestion control algorithms that buffer data packets and then send them in a burst comprising a plurality of data packets. Although all the packets in a single burst are sent at or very near the same time, typically at the rate permitted by bandwidth, the presence of cross traffic on the network 102 can cause the packets in the burst to be dispersed during transmission and reach the receiving client device 100 at times apart from one another. Bursts formed by the rate control and/or congestion control algorithms of transport layers can be denoted as "micro bursts" because they generally comprise a small number of packets that are sent within the burst at times very close together.

Traffic in a network 102 is often assumed to be fluid, such that during transmission packets spread into unused slots to occupy the available bandwidth of the network 102. If little or no cross traffic is present, the packets of a burst can stay close together and there is little dispersion. However, in the presence of cross traffic, more slots can be occupied and the packets in a burst can need to spread out farther to occupy unused slots than if the cross traffic was not present, and therefore there is larger dispersion of the burst's packets. The magnitude of the dispersion of a burst's packets can therefore provide a measure of the amount cross traffic in a network 102, which can lead to a measure of the available link bandwidth that is not being used by cross traffic.

However, while fair queue scheduling of packets can theoretically cause both the packets of a burst and the packets of other cross traffic to be treated with equal probability and be uniformly dispersed on average, in some real world conditions the fluid model of network traffic can be inaccurate. By way of a non-limiting example, a small burst of only two packets can happen to find two unused slots close together even in the presence of a large amount of cross traffic and therefore experience little or no dispersion, whereas in the same conditions the packets of a larger burst would need to spread much wider apart because of the cross traffic and therefore experience larger dispersion.

In addition, some methods of measuring the dispersion of a burst can be inexact because the receiving client device 100 does not have any information as to how the burst of packets was originally formed, how many packets are in the burst, or the spacing between times when the packets in the burst were sent. Existing methods of identifying on the receiving end which packets belong to which burst can produce incorrect results. By way of a non-limiting example, a client device 100 can use blind clustering to determine which packets are likely to have been sent by a content server 104 as the same burst. However, blind clustering can produce incorrect results, especially at micro-burst scales, because the client device 100 is blind as to how the content server 104 actually transmitted the packets.

Pacing Transmissions

Pacing data transmissions has also become common, especially with the widespread use of broadband internet connections. Pacing, also known as rate-shaping, can regulate media streams transmitted over networks 102 to an almost constant targeted bitrate. In some embodiments, the pacing can be done on the client side, in which a receiving client device 100 can at least partially regulate the media streams it receives. In other embodiments, the content server 104 can regulate outbound transmissions of media streams.

In some embodiments of client-side pacing, media streams can be sent via HTTP from a sending device to a receiving device. In some embodiments, the receiving device can be a client device 100 and the sending device can be a content server 104. The client device 100 can have a TCP receive window, and can transmit acknowledgements to the content server 104 when the client device 100 receives data from the content server 104. The client device's receive window can change its size with each acknowledgement that it sends. The content server 104 can track the size of the client device's receive window based on its acknowledgements. The content server 104 can also keep track of the number of bytes it has transmitted to the client device 100 for which it has not received acknowledgement. When the content server 104 determines that it has sent more data than can fit within the client device's receive window, the content server 104 can cease sending the media stream. When the client device resumes sending acknowledgements and thereby indicates that its receive window has room for more data, the content server 104 can resume sending the media stream. However, in this embodiment the client device 100 cannot easily pause the media stream because if the client device 100 sets its receive window to a very low value or to zero in an attempt to pause the media stream, the content server 104 can choose to abort the connection after a number of failed send operations or after a pre-determined timeout value. Instead, client devices 100 often continue to receive data and buffer the media stream instead of actually pausing transmission, which can cause excess traffic on the network 102.

In other embodiments of client-side pacing, the client device 100 can pull the media stream from the content server 104 at the available bandwidth, buffer the received data, and play the buffered media stream at the intended media bitrate. However, if the available network bandwidth is much larger than the intended media bitrate, the buffering at the client device 100 can quickly become unbounded.

While pacing by the client device 100 can cause the above problems, in other embodiments the content servers 104 can pace their own data transmissions. Server-side pacing can be useful for a content server 104 in scaling to different numbers of client devices 100 that are accessing media streams from the content server 104, especially when the number of client devices 100 accessing media streams from the content server 104 can change quickly.

Some content servers 104 use push protocols such as the Real Time Streaming Protocol (RTSP) or Real-time Transport Protocol (RTP) for streaming media data. In push protocols, the content server 104 can control the transfer rate, and can send data at a rate close to the bitrate of the media stream. Other content servers 104 use pull mechanisms. By way of a non-limiting example, streaming over HTTP uses a pull mechanism. Although push mechanisms can in some situations be more conducive for media streaming, streaming via HTTP is more commonly used because of easy access to HTTP servers, ease of traversal through Firewall and NAT systems, and easy deployment of HTTP servers. Server-side pacing, such as HTTP pull streaming, can also implement pausing transmissions of media streams more effectively than many client-side pacing schemes. When a client device 100 wishes to resume receipt of a media stream after the transmission has ceased, the client device 100 can restart the media stream at any time by providing a starting byte offset to the content server 104 corresponding to the point within a media stream that the client device 100 wishes to resume the media stream.

In some embodiments, a client device 100 can request that a media stream be sent from a content server 104 at a targeted bitrate that is equal to or higher than the bitrate of the media stream, based on the client device's available buffer size and/or the total duration of the media stream. The client device 100 can obtain information about the media stream's bitrate by obtaining it via the Session Description Protocol (SDP), the 'res' element of the content directory service under the Digital Living Network Alliance's Universal Plug and Play (DLNA/UPnP) protocols, Manifest file in adaptive streaming, or any other method.

In other embodiments, the content server 104 can know the media stream's bitrate, and can set the transmission rate to a rate equal to or higher than the media stream's bitrate. In some embodiments, the content server 104 can obtain information from the client device 100 about the client device's buffer size, and select the transmission rate based at least in part on the client device's buffer size.

A content server 104 can pace its transmission by calculating sleep-time intervals. During a sleep-time interval, no data is sent to the client device 100. Sleep-time intervals can be determined from the total sleep-time. In some embodiments, the total sleep-time can be the difference between the actual transmission time for sending data at the bandwidth available to the content server 104, and the targeted transmission time for sending data at the targeted paced transmission rate. The total sleep-time can be divided into a plurality of sleep-time intervals spaced along a time axis. Times along the time axis between each sleep-time interval can be non-sleep-time intervals, during which the content server 104 sends bursts of packets to the client device 100. In some embodiments, the content server 104 can determine duty factors for its transmitted bursts by calculating on-times for the bursts and off-times between the bursts. By modulating the intervals when bursts of packets are sent and when no data is sent, the content server 104 can achieve a target sending rate.

Micro-Bursts and Macro-Bursts

As discussed above, transport layers can have rate control and/or congestion control algorithms that buffer data packets and then send them in a burst at the same time or very near the same time. Bursts formed by the rate control and/or congestion control algorithms of transport layers can be denoted as "micro bursts" because they generally comprise a small number of packets that are sent within the burst at times very close together.

Also as discussed above, in server-side pacing schemes content servers 104 can pace their transmissions of media streams to client devices 100 by sending bursts of packets during non-sleep-time intervals, followed by sleep-times intervals during which no data is sent. The length of sleep-time intervals and non-sleep-time intervals can vary based on the desired transmission rate. However, in many situations and/or embodiments, the non-sleep-time intervals can be much larger than the periods of time during which packets are buffered and sent in "micro bursts" by the rate control and/or congestion control algorithms of transport layers. The bursts of packets sent by content servers 104 during non-sleep-time intervals can therefore be denoted as "macro bursts" because they are generally larger than "micro bursts," and/or are sent over longer time periods than "micro bursts." Macro bursts can smooth the transport layer throughput variations, while at the same time capturing the load variations in the network's core.

During transmission from a content server 104 to a client device 100 over a network 102, macro bursts and/or micro bursts can experience dispersion based on the amount of cross traffic on the network 104. Because macro bursts are larger than micro bursts, macro bursts are more likely to experience dispersion due to cross traffic, and therefore dispersion of the packets of a macro burst can be more characteristic of the effects of cross traffic on the available link bandwidth. In some embodiments and/or situations, looking at the dispersion of the packets of a macro burst can also remedy issues caused by interrupt coalescence, which can introduce small inter-packet arrival time intervals that can be misinterpreted as micro-bursts, as well as avoid source-destination time synchronization issues.

Figure 3:
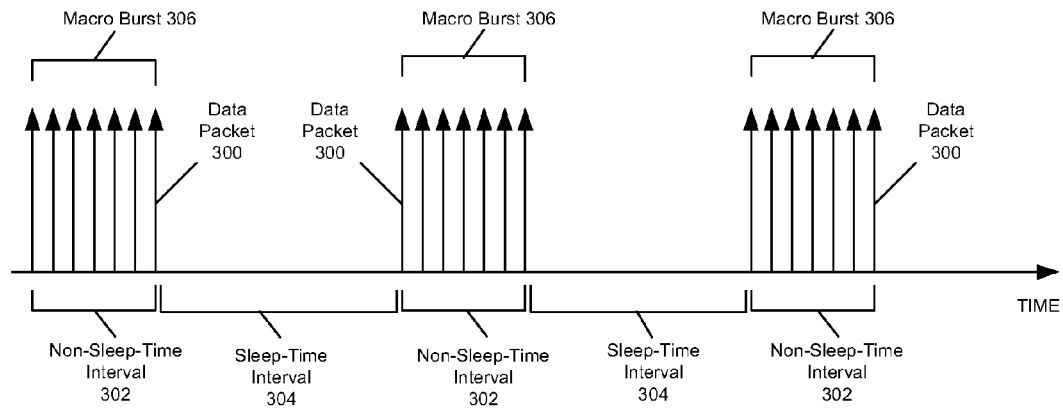
FIG. 3 depicts a timeline of packets transmitted during a server-side paced transmission.
Figure 4:
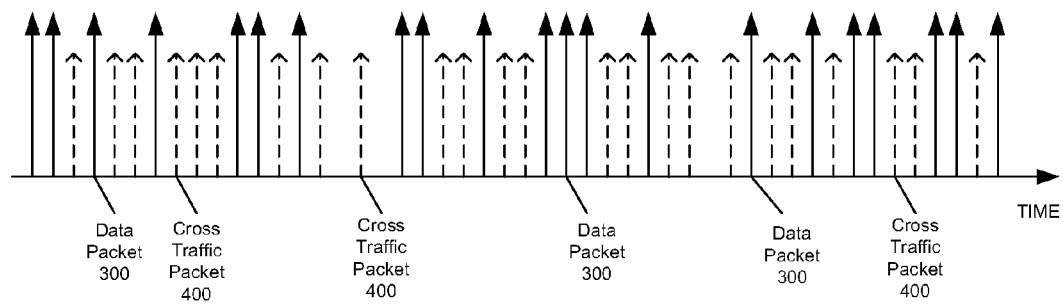
FIG. 4 depicts a timeline of packets as they are dispersed by cross traffic packets while in transit over a network.
Figure 5:
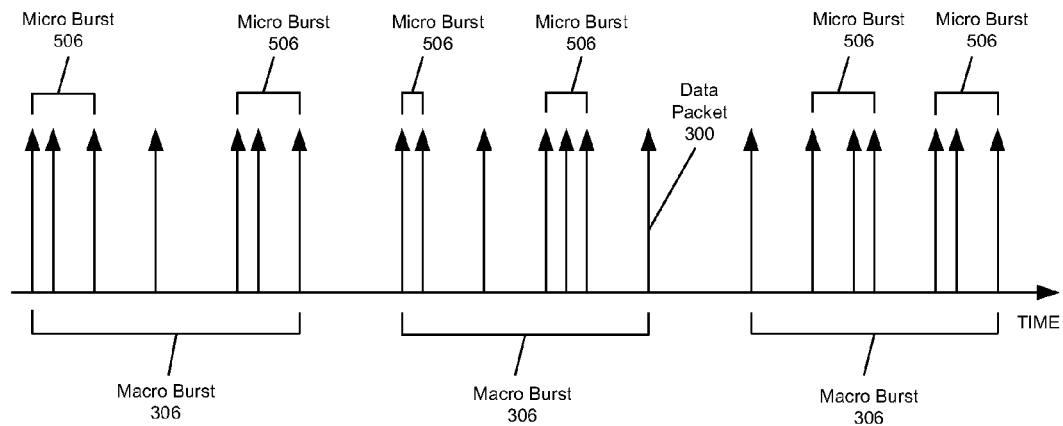
FIG. 5 depicts a timeline of dispersed packets as they are received by a client device.

However, it can be difficult for the receiving client device 100 to distinguish between the packets of a macro burst and a micro burst. By way of a non-limiting example, FIGS. 3-5 depict the packets 300 of macro bursts 306 as they are transmitted from a content server 104 in FIG. 3, dispersed during transmission over a network 102 due to cross traffic in FIG. 4, and received at a client device 100 in FIG. 5. FIG. 3 depicts a timeline of a server-side paced transmission in which three macro bursts 306 of packets 300 are sent from the content server 104 during non-sleep-time intervals 302 and no data sent during intermediate sleep-time intervals 304. FIG. 4 depicts a corresponding timeline of the packets 300 as they are dispersed by cross traffic packets 400 while in transit over the network 102. As can be seen from FIG. 4, an increase in the amount of cross traffic can have the effect of increasing the dispersal of the packets 300 in the macro burst 306. FIG. 5 depicts a corresponding timeline of the packets 300 as they are received by the client device 100. As can be seen from FIG. 5, the packets 300 can have been unequally dispersed during transmission due to cross traffic packets 400, leading the client device 100 to receive some of the packets 300 closer together in time than other packets 300.

The client device 100 can interpret small groupings of packets that are received close together to be micro bursts 506, and larger groupings of packets 300 received between gaps in which no data was received to be macro bursts 306, as shown in FIG. 5. Because the perceived micro bursts 506 can sometimes have only two or three packets 300, the dispersion characteristics of the bursts may not be apparent. Additionally, the inter-burst intervals and intra-burst intervals between packets 300 of the micro bursts 506 are on the same order, which can cause blind clustering algorithms to misidentify micro bursts. In contrast, the dispersal of packets 300 within the macro bursts 306 can be more uniform across all three illustrated macro bursts 306. Measuring the dispersal of the packets 300 of macro bursts 306 can provide a better measure of the available link bandwidth than the dispersal of packets 300 of micro bursts 506.

Figure 6:
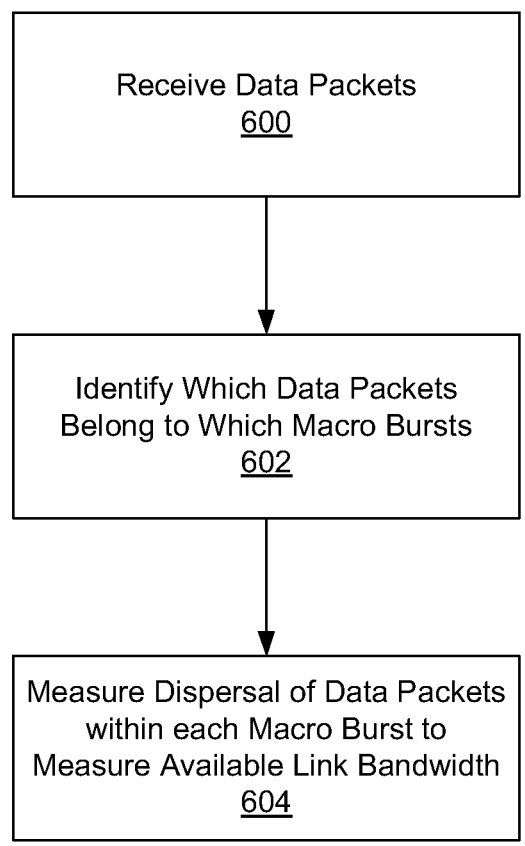
FIG. 6 depicts a method that a client device can use to determine the available link bandwidth from the dispersal of macro bursts.

FIG. 6 depicts a method that a client device 100 can use to determine the available link bandwidth from the dispersal of macro bursts. At step 600, the client device 100 can receive one or more data packets 300. The data packets 300 can have been transmitted to the client device 100 over one or more networks 102 from a content server 104 and/or another client device 100 as part of a media stream.

At step 602, the receiving client device 100 can identify which received packets 300 belong to which macro bursts 306 to identify macro bursts 306 and/or distinguish between different macro bursts 306. As FIG. 5 shows, the dispersal of the packets 300 of a macro burst 306 can provide a better measure of the amount of cross traffic, and therefore the available link bandwidth, than the dispersal of the packets 300 of a micro burst 506.

In some embodiments, the client device 100 can use blind clustering algorithms at step 602 to distinguish between macro bursts 306. The blind clustering algorithms can determine a threshold interval between inter-packet arrival times. The blind clustering algorithms can group all packets 300 that arriving at time intervals closer together than the threshold interval as the same macro burst 306, and group packets 306 arriving at times farther apart than the threshold interval as different macro bursts 306.

In other embodiments, the receiving client device 100 can sort received data packets 300 into one or more macro bursts 306 based on burst identifiers 700 inserted at or before transmission by the content server 104 or a sending client device 100 into the macro bursts 306 and/or data packets 300. The content server 104 or sending client device 100 can have associated each macro burst 306 with a unique burst identifier 700. The unique burst identifiers 700 can be unaffected by hardware elements or gateways on the network 102.

The client device 100 can use the unique burst identifiers 700 at step 602 to unambiguously determine which received packets 300 belong to which macro bursts 306 and/or when one macro burst 306 ends and another macro burst 306 begins, regardless of whether or not cross traffic has dispersed the packets 300 of any macro bursts 306 during transmission. The client device 100 can classify received packets 300 as an intra-burst packets belonging to the same macro burst 306, or inter-burst packets belonging to different macro bursts 306.

Figure 7:
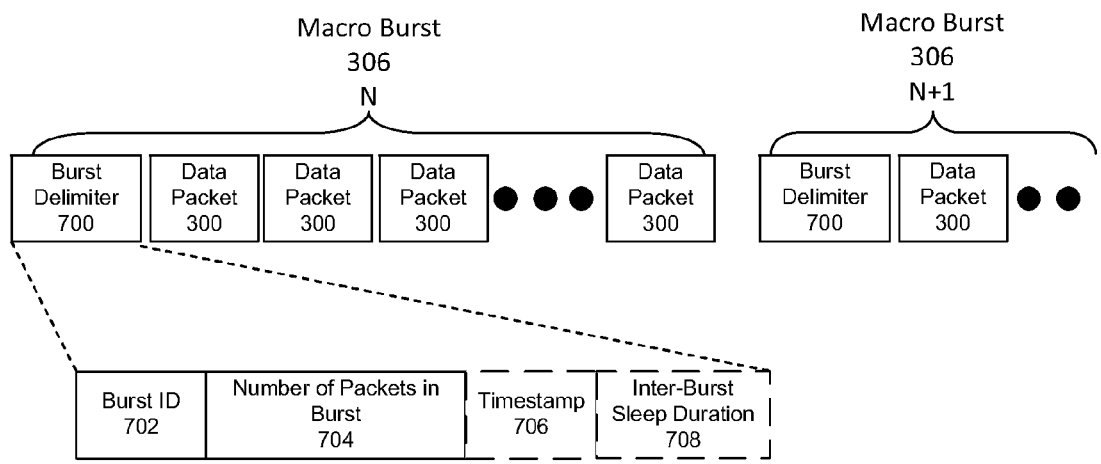
FIG. 7 depicts an exemplary embodiment in which a sending device transmitted a burst delimiter in advance of the packets within each macro burst.

In some embodiments, the unique burst identifiers 700 can be a burst delimiter transmitted at the beginning of each macro burst 306. By way of a non-limiting example, FIG. 7 depicts an embodiment in which the content server 104 or sending client device 100 transmitted a burst delimiter in advance of the packets 300 within each macro burst 306. Each macro burst 306 can have been transmitted during a non-sleep-time interval 302, followed by a sleep-time interval 304 during which no data was sent. The burst delimiter can indicate a burst ID 702, and a number 704 of packets 300 within the macro burst 306. In some embodiments, the burst delimiter can further indicate a timestamp 706 and/or a duration 708 of inter-burst sleep-time intervals.

Figure 8:
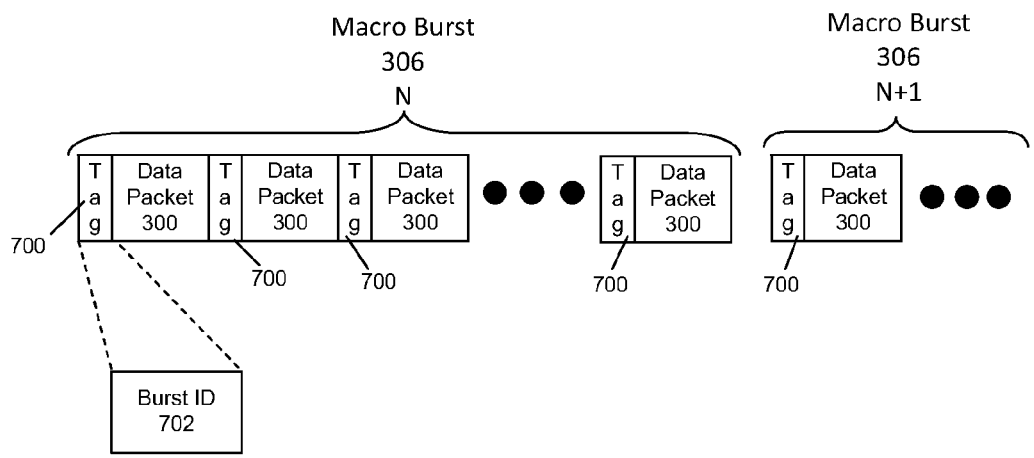
FIG. 8 depicts an exemplary embodiment in which a sending device inserted a tag into each packet of each macro burst.

In other embodiments, the unique burst identifiers 700 can be tags. By way of a non-limiting example, FIG. 8 depicts an embodiment in which the content server 104 or sending client device 100 inserted a tag into each packet 300 of each macro burst 306. Each packet's tag can indicate the burst ID 702 of the macro burst 306 that the packet 300 was grouped into by the content server 104 or sending client device 100 at or before the time of transmission.

The insertion of the unique identifiers can occur at the content server 104 or sending client device 100 during or prior to transmission of the data packets 300 in a macro burst

306 at the application layer, transport layer, or at any other intermediate layer, module, or component.

By way of a non-limiting example, in some embodiments an HTTP range header can be used to demarcate macro bursts 306 at the application layer. In some embodiments, an ADU (application data unit) such as an HTTP response unit with HTTP range header can be used for the demarcation. An HTTP content server 104 can respond to a GET request by a client device 100 in multiple responses by using a 206 (partial content) return code and a range header supported by HTTP/1.1. The HTTP content server 104 can transmit a macro burst 306 of packets 300 as a partial response. In these embodiments, the HTTP range headers can serve as burst delimiters for each macro burst 306. The client device 100 can read the HTTP range header of each received packet 300 to sort the received packets 300 into macro bursts 306 at step 602.

By way of another non-limiting example, in some embodiments a module between the HTTP application layer and the UDP/TCP transport layer of the sending device can insert a burst header at the beginning of each macro burst 306. Each burst header can comprise a sequence number and/or timestamp field. A corresponding module at the client device 100 can remove the burst header when received, reconstruct the packet's original payload as it existed prior to insertion of the burst header at the content server, and then send the original payload from the module to the client device's application layer. The client device 100 can use the extracted burst headers to sort received packets 300 into particular uniquely identifiable macro bursts 306 at step 602.

By way of a further non-limiting example, in some embodiments macro bursts 306 can be tagged at a TCP transport layer using the optional timestamp field in the TCP header. The sending device can have set all packets 300 belonging to a particular macro burst 306 to have the same timestamp. When the client device 100 receives the packets 300, the client device 100 can sort all packets 300 having the same timestamp in the TCP header into the same macro burst 306.

By way of yet another non-limiting example, in some embodiments macro bursts 306 can be tagged by the sending device using the reserved 3-bit field in the TCP header to indicate a burst ID 702 or burst number. In some embodiments, the burst ID 702 can be an integer ranging from 0 to 7. In these embodiments, the burst ID 702 can be incremented by one for each subsequent macro burst 306 that is transmitted, with the next burst ID 702 returning to 0 after 7 has been used. In some embodiments a range for the burst ID 702 of 0 to 7 can be sufficient because it is rare that more than 8 macro bursts 306 are received out of order, however in other embodiments, the burst ID 702 can be a number in any other range, a text string, or any other desired identifier.

At step 604, the client device 100 can analyze the packets 300 determined during step 602 to be parts of individual macro bursts 306 to determine the available link bandwidth. The client device 100 can track the rate of receipt of packets 300 within each macro burst 306 to measure the amount of dispersion experienced by the packets 306 within each macro burst 306 during transmission. The amount of dispersion in each macro burst can indicate the amount of cross traffic on the network 102. The amount of cross traffic can provide a measure of the available link bandwidth. Because cross traffic itself uses up bandwidth, a large amount of cross traffic can indicate that there is less link bandwidth available, while a low amount of cross traffic can indicate that there is a larger amount of available link bandwidth unused by cross traffic.

In some embodiments, the measure of the available link bandwidth can be calculated by the client device 100 after receipt of each macro burst 306, and the client device 100 can average the available link bandwidth across a plurality of macro bursts 306. In some embodiments, the average available link bandwidth can be calculated using a moving window. By way of a non-limiting example, in some embodiments the client device 100 can average the available link bandwidth over the last 20 macro bursts received.

Figure 9:
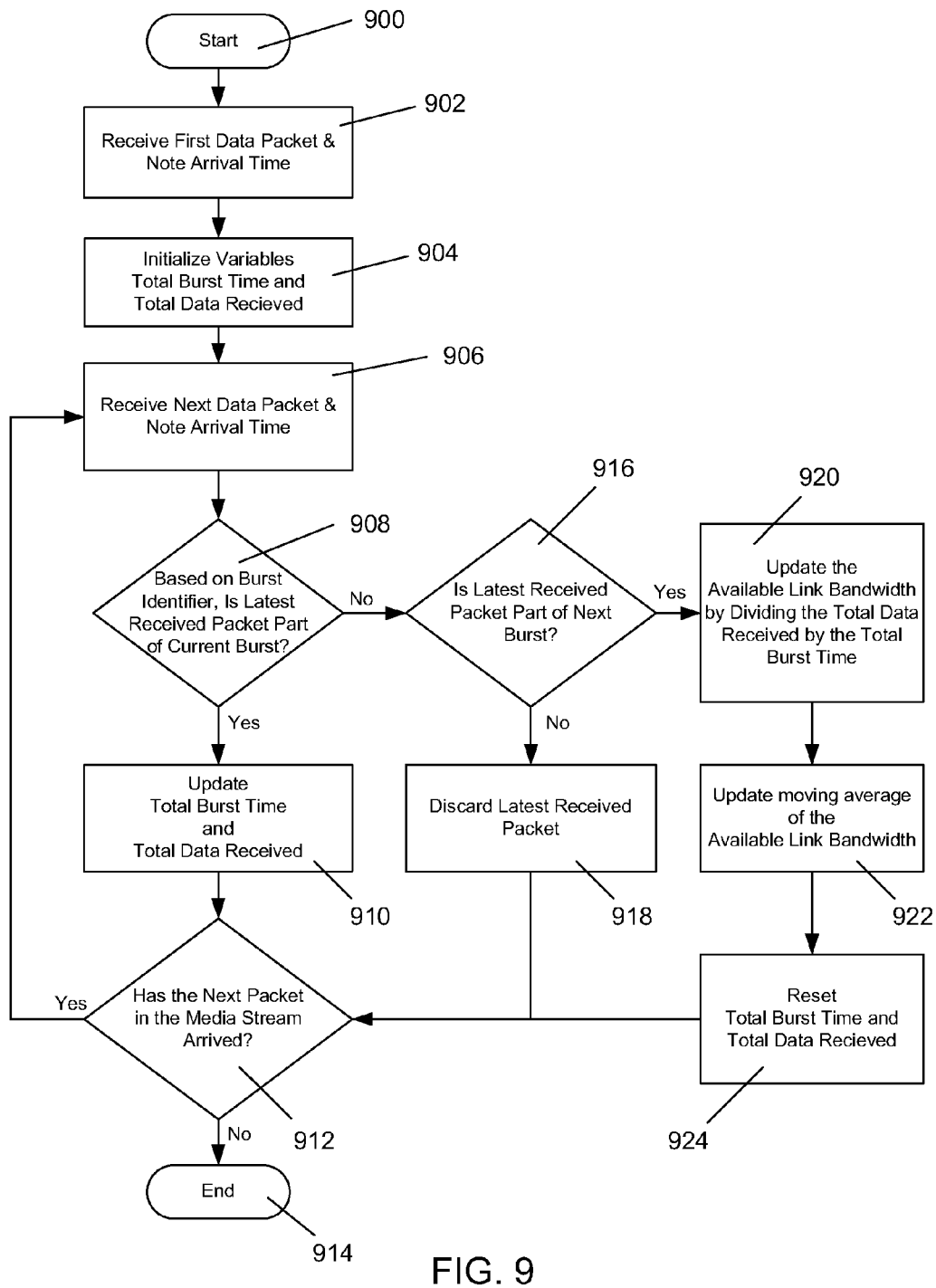
FIG. 9 depicts an exemplary method of determining the available link bandwidth.

FIG. 9 depicts a flow chart illustrating an exemplary implementation of the method of FIG. 6. At step 900, the client device 100 can request a media stream and/or begin receiving a media stream from a content server 104 or a sending client device 100 over a network 102. At step 902, the client device 100 can receive the first packet 300 in the media stream and can note that packet's arrival time. At step 904, the client device 100 can initialize variables for the total burst time and the total data received. The total burst time variable can keep track of the total time a particular macro burst 306 has been active based on packets 300 received at the client device 100. The total data received variable can keep track of the total number of bytes of data contained in all the packets 300 belonging to a particular macro burst 306. At step 904, the total burst time variable can be initialized to zero, and the total data received variable can be initialized to the number of bytes in the first packet received at step 902.

At step 906, the client device 100 can receive the next packet 300 in the media stream and can note that next packet's arrival time. At step 908, the client device 100 can determine whether the latest received packet 300 belongs to the same macro burst 306 as one or more previously received packets 300, based on unique identifiers 700 of the macro bursts 306 inserted into the media stream at or before transmission by the content server 104 or sending client device 100. As discussed with respect to FIGS. 6-8, the unique identifiers 700 can be burst delimiters, tags, or other unique identifiers. At step 910, if the latest received packet 300 belongs to the same macro burst 306 as one or more previously received packets 300, the client device 100 can update the total burst time variable by determining time intervals between the arrival times noted during steps 902 and/or 906, and adding the inter-packet arrival time interval between the latest received packet 300 and the next-most recently received packet 300 to the previous value of the total burst time variable. By way of a non-limiting example, the value of the total burst time variable can be a summation of all the inter-packet arrival time intervals between the arrival times of all received packets determined to be part of the current macro burst 306. Similarly, at step 910 the total data received variable can be updated to add the number of bytes in the latest received packet 300 to the previous value of the total data received variable. By way of a non-limiting example, the total data received variable can be a summation of the number of bytes in all received packets 300 determined to be a part of the current macro burst 306.

After the total burst time variable and the total data received variable have been updated at step 910, the client device 100 can move to step 912 to check if the next packet 300 in the media stream has arrived. At step 912, if the next packet 300 in the media stream has arrived, the client device 100 can return to step 906 to receive the next packet 300 and note its arrival time, but if the next packet 300 in the media stream has not arrived, the process can end at step 914.

At step 908, if the latest received packet 300 is not determined to be part of the same macro burst 306 as one or more previously received packets 300 based on the latest received packet's unique identifier 700, the client device 100 can move to step 916 and use the unique identifier 700 to determine if the latest received packet 300 belongs to the next macro burst 306. If it does not, the client device 100 can move to step 918 and discard the packet 300, then move to step 912 to check if the next packet 300 in the media stream has arrived.

If the client device 100 determines at step 916 that the latest received packet 300 belongs to the next macro burst 306, the client device 100 can move to step 920 to determine the available link bandwidth. Because the client device 100 has determined that it has begun to receive packets 300 belonging to a subsequent macro burst 306, the client device 100 can consider the previous macro burst 306 to be complete, and can measure the dispersion of the packets 300 of the entirely received previous macro burst 306 to obtain a measure of the available link bandwidth. In some embodiments, the client device 100 can determine the available link bandwidth by dividing the value of the total data received variable by the value of the total burst time. Any transport packets during error and retransmission periods can be neglected in order to keep the data collection limited to a clean and steady phase.

At step 922, the client device 100 can determine a moving average of the available link bandwidth. The client device 100 can average one or more available link bandwidth measurements determined at step 920 for one or more previously received macro bursts 306. In some embodiments, the client device 100 can average the available link bandwidth over a window of previously received macro bursts 306. In other embodiments, the client device 100 can calculate a weighted average between recent measurements and previously stored values by using a weighing factor of $\alpha$, (wherein $0<\alpha<1$). By way of a non-limiting example, the client device can average the available link bandwidth over the previous 20 received macro bursts 306.

At step 924, the client device 100 can reset the total burst time variable and the total data received variable, such that they can be re-used for the current macro burst 306. Because the client device 100 determined at step 916 that a new macro burst 306 is the current macro burst 306, the client device 100 can set the total burst time variable and the total data received variable according to the first received packet 300 determined to be part of the new current macro burst 306. By way of a non-limiting example, the total burst time variable can be reset to zero, and the total data received variable can be reset to the amount of data in the first received packet 300 determined to be part of the new current macro burst 306. The client system 100 can then move to step 912 to check if the next packet 300 in the media stream has arrived.

In alternate embodiments, the available link bandwidth can be determined from the dispersion of the packets of macro bursts 306, when the macro bursts 306 are distinguished according to threshold based clustering. In threshold based clustering, the threshold can be derived from intra-burst and inter-burst arrival time intervals. In some embodiments, threshold based clustering can be used as a check on the determination of macro bursts 306 through unique identifiers 700.

Simulation Results

Figure 10:
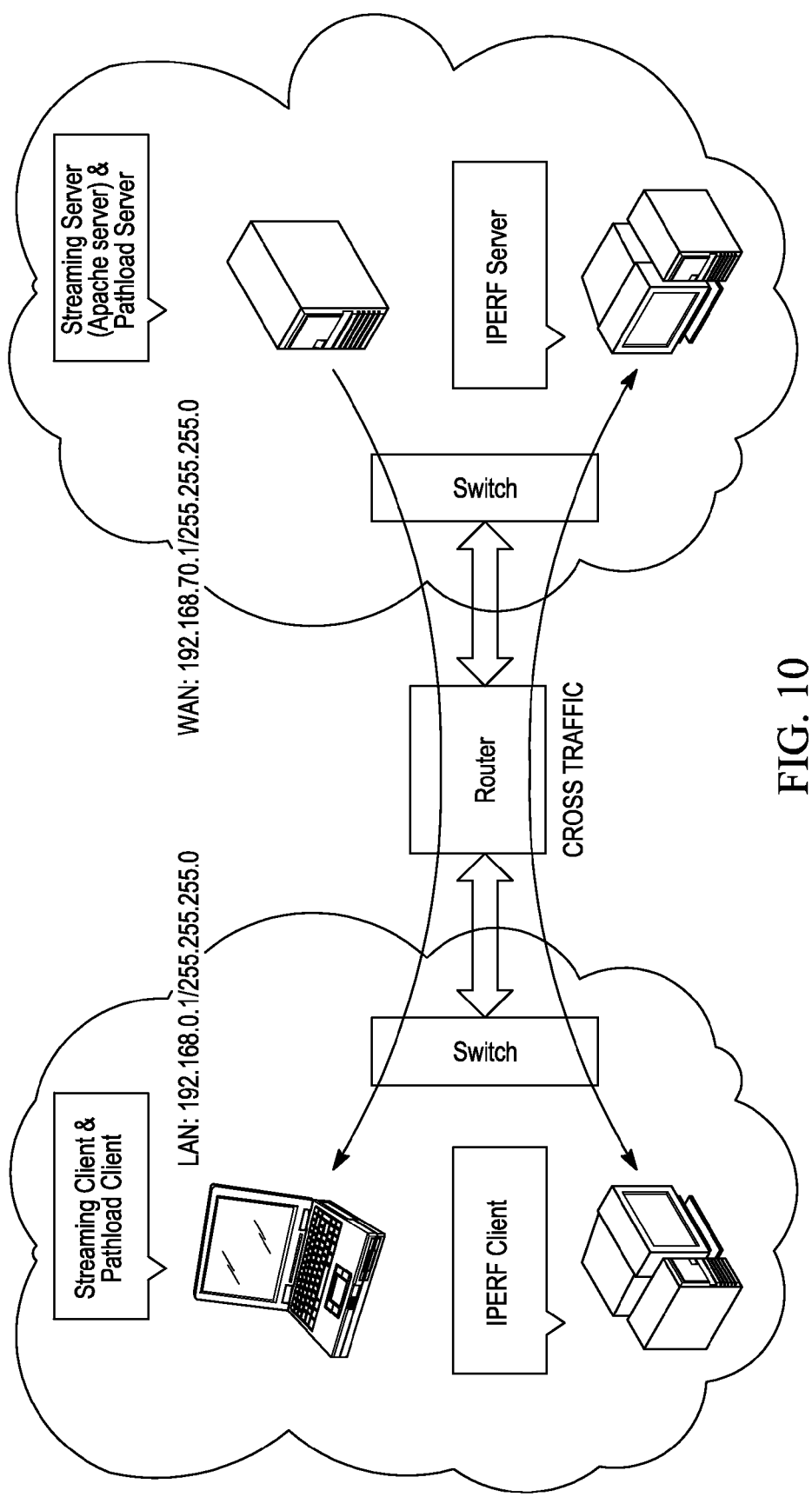
FIG. 10 depicts the simulation topology used to generate the simulation results shown in FIGS. 11-15.

Simulations were performed using the available link bandwidth measurement method shown in FIG. 9, hereinafter denoted as the inter-packet arrival (IPA) method. The IPA simulations were compared to other methods of measuring network conditions. FIG. 10 depicts the simulation topology in which the measurements were performed. A single hop network was used with WAN & LAN subnets connected through two switches and a router. The WAN IP address range was 192.168.70.1-192.168.70.255 with a subnet mask of 255.255.255.0 and the LAN IP address range was 192.168.0.1-192.168.0.255 with a subnet mask of 255.255.255.0. The streaming server was a Linux machine running a standard Apache server with a mod_bw module, a software module used to enforce throttling on selective media streams. The streaming client was a Linux machine with Curl library, an open source library for HTTP based applications. The client device requested stream data through HTTP. The client device also ran an application, using an open source libpcap library, for collecting statistics of data packets over a network. Open source Pathload server and client software were installed on the streaming server and the client respectively. This set-up was used to get the actual available bandwidth between server and client. IPerf, an open source tool to send and receive TCP/UDP data, client and server utilities were used to inject CBR cross-traffic. These utilities were running on separate machines in the LAN and WAN networks as shown in the topology.

FIGS. 11-14 depict non-limiting exemplary results of IPA simulations measuring available link bandwidth compared to the results of a buffer-fullness (BF) method The buffer-fullness method uses a leaky bucket theory, in which the inflow rate is the rate at which data is received at the client device 100, and the outflow rate is the rate at which data is consumed. Under the buffer-fullness method, if the inflow rate is too low, the media stream can be switched to a lower bit rate, and if the inflow rate is too high, such that the buffer is filled beyond its threshold, the media stream can be switched to a higher bitrate. The buffer-fullness method therefore measures the link throughput (alternatively referred as "goodput") by measuring the rate of reception of packets, but does not necessarily measure the available link bandwidth.

The figures also show the variation of IPERF cross traffic to show the correlation between available link bandwidth and cross traffic. As shown in the figures, cross traffic can be inversely proportional to the available link bandwidth, and a summation of the cross traffic and the available link bandwidth can approximately equate to the link capacity.

In these simulations, the mod_bw module was configured to throttle the content at 30K bytes per second (Rs). The macro burst size was set to 8192 bytes (Sburst). These settings led to an inter burst sleep time of roughly 270 ms (TBurst=Sburst/Rs). Although as described above, in non-simulation conditions the burst length and sleep-times can be determined by the client device 100 using unique identifiers 700 inserted into macro bursts 306 by the sending device, it should be noted that in these simulations the burst length and sleep-times were known to the receiving client device 100 a priori. Clustering of the packets into macro bursts 306 was performed in the simulations using this a priori knowledge.

Different simulations were performed using different threshold values (Tth) to measure the available link bandwidth. Different sizes of macro bursts 306 were determined based on the different inter-packet arrival time thresholds, leading to different measurements of available link bandwidth. The simulation results shown in FIG. 11 used an inter-packet arrival time threshold (Tth) of 10 ms. The simulation results shown in FIG. 12 used an inter-packet arrival time threshold (Tth) of 100 ms. The simulation results shown in FIG. 13 used an inter-packet arrival time threshold (Tth) of 200 ms. The simulation results shown in FIG. 14 used an inter-packet arrival time threshold (Tth) of 300 ms.

It was inferred that threshold for inter-packet arrival times used should be much lower than TBurst and much higher than a typical inter packet arrival time for a given lowest actual available bandwidth (Abw-a). For example, the threshold (Tth) should fit the following inequality: (Size of TCP packet)/Abw-a$\ll$Tth$\ll$TBurst. For the simulations shown in FIGS. 11-14, the Abw-a was roughtly 3 mbps and the size of TCP packets were 1500 bytes, leading to a threshold (Tth) inequality equation of 3.8 ms$\ll$Tth$\ll$270 ms. Based on the simulations, threshold values (Tth) at or between 50 ms and 200 ms were found to best give a measurement of the available link bandwidth.

A moving average was used to calculate the available link bandwidth in the shown simulation results. A window of 20 macro bursts, generally corresponding to 5 seconds of data, was found to be satisfactory.

Figure 14:
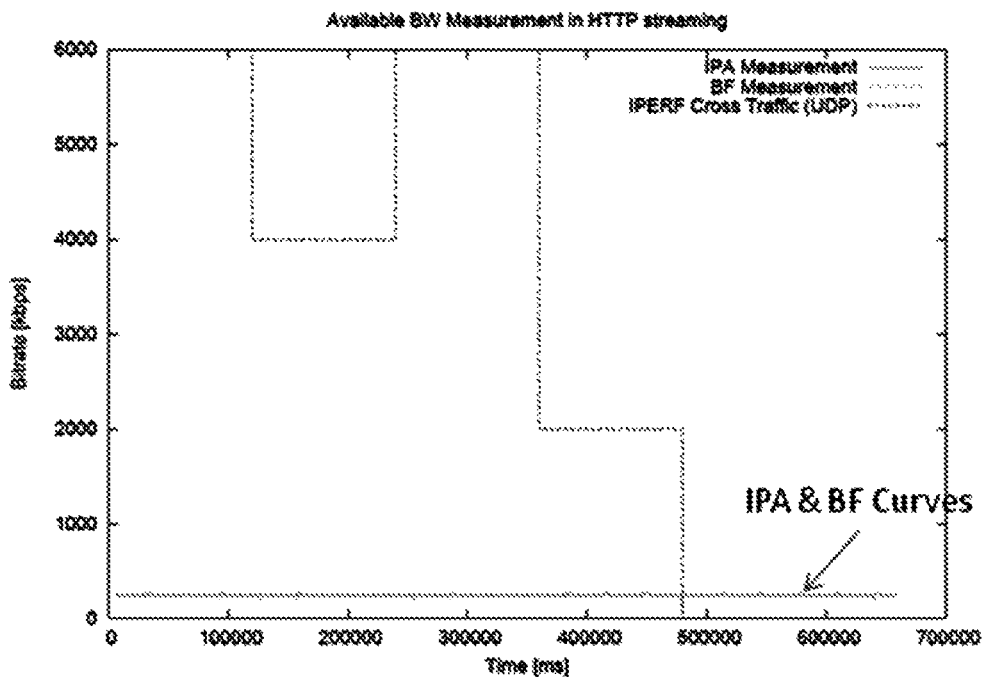
FIG. 14 depicts exemplary results of a simulation of available bandwidth measurements in which an inter packet arrival time threshold was set at 300 ms.
Figure 15:
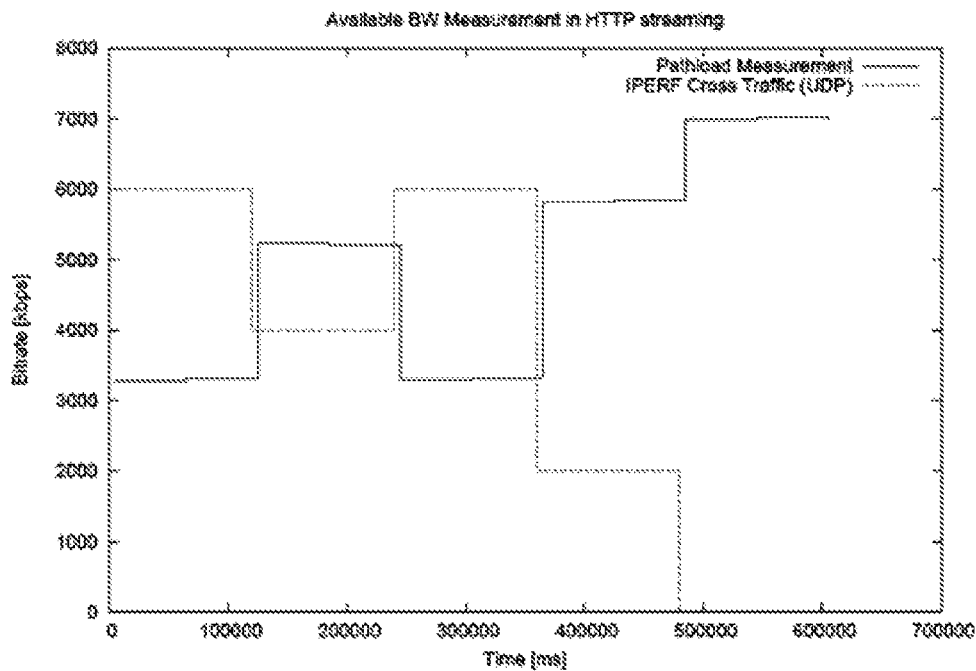
FIG. 15 depicts exemplary results of a simulation of available bandwidth measurements using an open source Pathload tool.

FIG. 15 depicts a non-limiting exemplary result of an IPA simulation depicting measurements from Pathload (an open source tool for measuring available link bandwidth) overlaid on the UDP cross traffic. The Pathload measurements were run at intervals of one minute and a measurement window of 20 seconds, and used as a reference for the IPA measurements of available link bandwidth shown in FIGS. 11-14.

The simulation results confirm that when the threshold value (Tth) was set at or between 50 ms and 200 ms, the disclosed IPA measurement method resulted in very accurate measurements of the available link bandwidth when the streaming device uses throttling to pace its transmission. The buffer-fullness (BF) method measured only the actual link throughput (alternatively referred to as "goodput").

Figure 11:
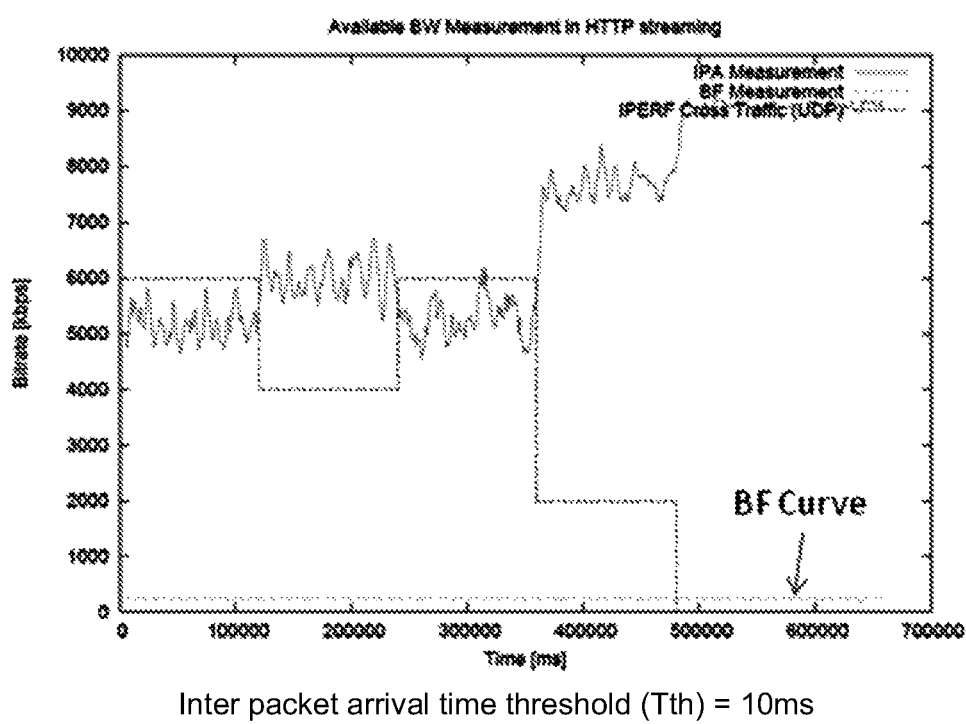
FIG. 11 depicts exemplary results of a simulation of available bandwidth measurements in which an inter packet arrival time threshold was set at 10 ms.
Figure 12:
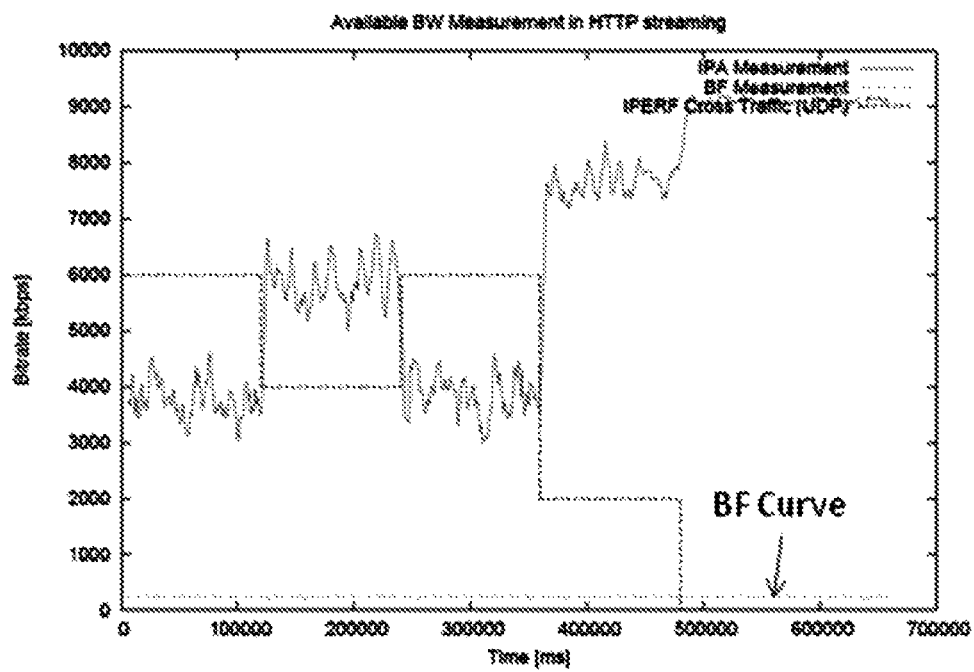
FIG. 12 depicts exemplary results of a simulation of available bandwidth measurements in which an inter packet arrival time threshold was set at 100 ms.
Figure 13:
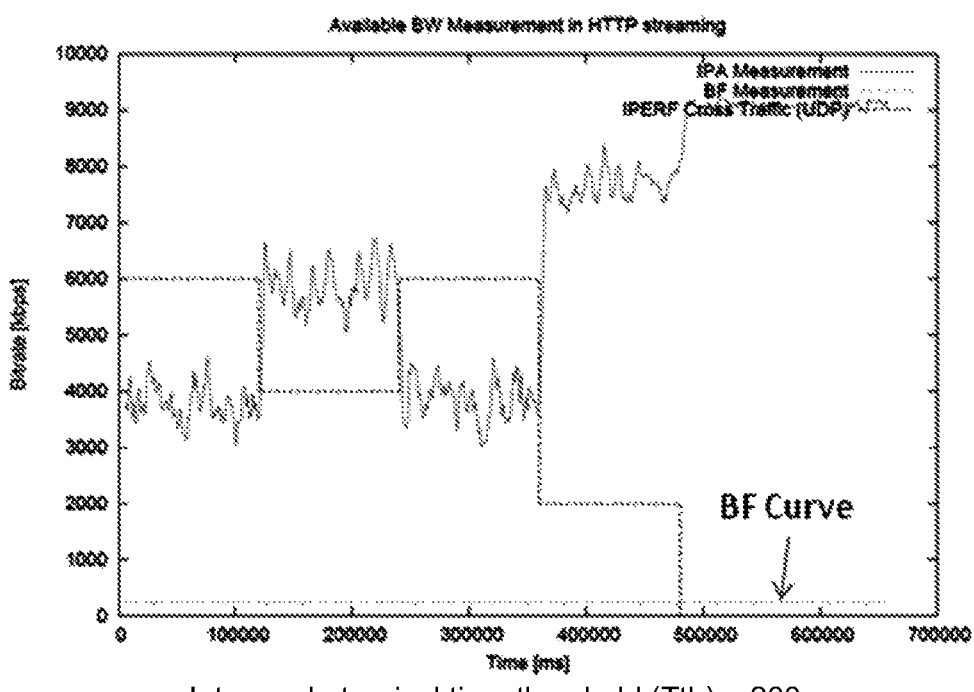
FIG. 13 depicts exemplary results of a simulation of available bandwidth measurements in which an inter packet arrival time threshold was set at 200 ms.

In real-world conditions, the receiving client device 100 can use the unique identifiers to determine macro bursts 306, which in some situations can be bursts lasting between 50 ms and 200 ms. Measurements of the dispersal of the packets 300 of those macro bursts 306 can assist in accurate measurements of the available link bandwidth, similar to the measurements shown in FIGS. 12-13. If the client device 100 looked at only micro bursts, which can last for a duration similar to a 10 ms threshold value (Tth), the available link bandwidth can be overestimated as shown in FIG. 11. If the client device 100 did not determine macro bursts 306 and/or looked at portions of the media stream lasting longer than a 300 ms threshold value (Tth), the available link bandwidth would be underestimated, possibly at the level of the link throughput (alternatively referred as "goodput") instead of the actual available link bandwidth as shown in FIG. 14.

Hardware Description

Figure 16:
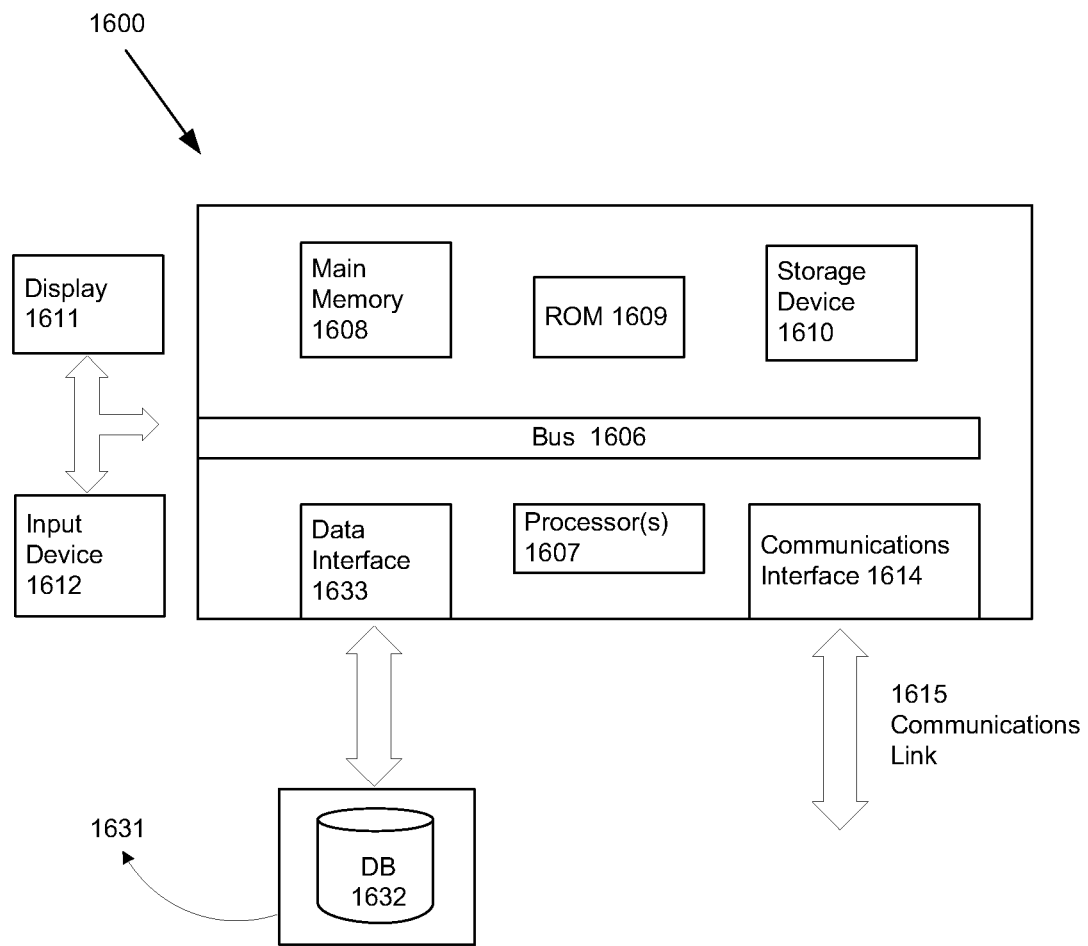
FIG. 16 depicts an exemplary embodiment of computer hardware that can perform the disclosed embodiments and methods.

The execution of the sequences of instructions required to practice the above embodiments and methods may be performed by a computer system 1600 as shown in FIG. 16. In an embodiment, execution of the sequences of instructions is performed by a single computer system 1600. According to other embodiments, two or more computer systems 1600 coupled by a communication link 1615 may perform the sequence of instructions in coordination with one another. Although a description of only one computer system 1600 may be presented herein, it should be understood that any number of computer systems 1600 may be employed.

A computer system 1600 according to an embodiment will now be described with reference to FIG. 16, which is a block diagram of the functional components of a computer system 1600. As used herein, the term computer system 1600 is broadly used to describe any computing device that can store and independently run one or more programs.

The computer system 1600 may include a communication interface 1614 coupled to the bus 1606. The communication interface 1614 provides two-way communication between computer systems 1600. The communication interface 1614 of a respective computer system 1600 transmits and receives electrical, electromagnetic or optical signals, that include data streams representing various types of signal information, e.g., instructions, messages and data. A communication link 1615 links one computer system 1600 with another computer system 1600. For example, the communication link 1615 may be a LAN, an integrated services digital network (ISDN) card, a modem, or the Internet.

A computer system 1600 may transmit and receive messages, data, and instructions, including programs, i.e., application, code, through its respective communication link 1615 and communication interface 1614. Received program code may be executed by the respective processor(s) 1607 as it is received, and/or stored in the storage device 1610, or other associated non-volatile media, for later execution.

In an embodiment, the computer system 1600 operates in conjunction with a data storage system 1631, e.g., a data storage system 1631 that contains a database 1632 that is readily accessible by the computer system 1600. The computer system 1600 communicates with the data storage system 1631 through a data interface 1633.

Computer system 1600 can include a bus 1606 or other communication mechanism for communicating the instructions, messages and data, collectively, information, and one or more processors 1607 coupled with the bus 1606 for processing information. Computer system 1600 also includes a main memory 1608, such as a random access memory (RAM) or other dynamic storage device, coupled to the bus 1606 for storing dynamic data and instructions to be executed by the processor(s) 1607. The computer system 1600 may further include a read only memory (ROM) 1609 or other static storage device coupled to the bus 1606 for storing static data and instructions for the processor(s) 1607. A storage device 1610, such as a magnetic disk or optical disk, may also be provided and coupled to the bus 1606 for storing data and instructions for the processor(s) 1607.

A computer system 1600 may be coupled via the bus 1606 to a display device 1611, such as an LCD screen. An input device 1612, e.g., alphanumeric and other keys, is coupled to the bus 1606 for communicating information and command selections to the processor(s) 1607.

According to one embodiment, an individual computer system 1600 performs specific operations by their respective processor(s) 1607 executing one or more sequences of one or more instructions contained in the main memory 1608. Such instructions may be read into the main memory 1608 from another computer-usable medium, such as the ROM 1609 or the storage device 1610. Execution of the sequences of instructions contained in the main memory 1608 causes the processor(s) 1607 to perform the processes described herein. In alternative embodiments, hard-wired circuitry may be used in place of or in combination with software instructions. Thus, embodiments are not limited to any specific combination of hardware circuitry and/or software.

Although the present invention has been described above with particularity, this was merely to teach one of ordinary skill in the art how to make and use the invention. Many additional modifications will fall within the scope of the invention, as that scope is defined by the following claims.

What is claimed:

1. A method of passively measuring available link bandwidth at a client device that receives media data over a network connection comprising:

receiving packets of a media stream at said client device, wherein one or more said receiving packets comprises a unique identifier indicating that one or more said receiving packets are associated with a macro burst or a micro burst, wherein said unique identifiers are indicated in timestamp fields of Transmission Control Protocol (TCP) headers, and wherein the unique identifiers are indicated in reserved 3-bit fields in the TCP headers;

sorting said receiving packets into one or more of said macro bursts or micro bursts based on said unique identifier; and determining the link bandwidth available to said client device based at least in part on the time intervals between arrival times of the packets sorted into individual macro bursts or micro bursts, wherein said macro bursts and said micro bursts each comprise a plurality of packets transmitted together by a sending device to regulate the sending device's transmission rate.

2. The method of claim 1, wherein said unique identifiers are tags that were inserted into said receiving packets by said sending device.

3. The method of claim 1, wherein said unique identifiers are burst delimiters that were transmitted by said sending device at the beginning of each said macro burst.

4. The method of claim 3, wherein said burst delimiter is a burst header comprising a sequence number and a timestamp field.

5. The method of claim 1, wherein said receiving packets are received at said client device over an HTTP connection.

6. The method of claim 1, wherein said receiving packets are TCP packets.

7. The method of claim 1, wherein each said macro burst is an HTTP partial response transmission and said unique identifiers are tags within HTTP range headers.

8. The method of claim 1, wherein said receiving packets received as part of a media stream were transmitted as an adaptive bitrate stream.

9. The method of claim 8, further comprising transmitting a request that subsequent portions of said adaptive bitrate stream be sent at a bitrate appropriate for said link bandwidth determined to be available to said client device.

10. The method of claim 1, wherein said receiving packets received as part of a media stream were transmitted as a scalable media stream.

11. The method of claim 10, further comprising transmitting a request for a data range of said scalable media stream corresponding to a version of said media stream appropriate for said link bandwidth determined to be available to said client device.

12. The method of claim 1, wherein said client device receives said receiving packets of said media stream over a network from a content server.

13. The method of claim wherein said client device receives said receiving packets of said media stream over a network from a second client device as part of a video chat.

14. The method of claim 13, further comprising:

transmitting feedback from said client device to said second client device, said feedback comprising information about said link bandwidth determined to be available to said client device, wherein said feedback allows said second client device to adjust the encoding parameters of said media stream based on said link bandwidth determined to be available to said client device.

15. The method of claim 1, wherein determining the link bandwidth available to said client device further comprises:

monitoring the arrival times of said receiving packets when said receiving packets are received;

determining if said unique identifiers have changed from one receiving packets to the next receiving packets;

determining a macro burst duration based on the time interval between the arrival times of receiving packets between which said unique identifiers changed; determining amount of data received during said burst duration;

determining said link bandwidth available to said client device during said macro burst duration based at least in part on total data received in said macro burst and said macro burst duration.

16. The method of claim 1, further comprising determining an average link bandwidth over a moving window by averaging the link bandwidth determined to be available to said client device for each of a predetermined number of previously received said macro bursts.

* * * * *